(12) United States Patent
Tsuboi

(10) Patent No.: US 6,498,457 B1
(45) Date of Patent: Dec. 24, 2002

(54) BATTERY EXCHANGE APPARATUS

(75) Inventor: Masaharu Tsuboi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,563

(22) Filed: May 25, 2000

(30) Foreign Application Priority Data

| May 25, 1999 | (JP) | ............................................. 11-144909 |
| May 25, 1999 | (JP) | ............................................. 11-144910 |
| May 25, 1999 | (JP) | ............................................. 11-144911 |

(51) Int. Cl.$^7$ ................................................. H02J 7/00
(52) U.S. Cl. ....................................................... 320/110
(58) Field of Search ........................................... 320/110

(56) References Cited

U.S. PATENT DOCUMENTS

| 5,686,811 | A | * | 11/1997 | Bushong et al. | ............. | 320/110 |
| 5,742,149 | A | * | 4/1998 | Simpson | ..................... | 320/110 |
| 5,831,413 | A | * | 11/1998 | Gould | ......................... | 320/110 |
| 5,831,414 | A | * | 11/1998 | Yokota et al. | ............... | 320/110 |
| 5,917,306 | A | * | 6/1999 | Fischl et al. | ................. | 320/110 |
| 5,925,942 | A | * | 7/1999 | Theoblad | ..................... | 320/110 |
| 5,939,859 | A | * | 8/1999 | Morita | ......................... | 320/110 |
| 5,963,014 | A | * | 10/1999 | Chen | ............................ | 320/110 |
| 6,049,192 | A | * | 4/2000 | Kfoury et al. | ............... | 320/110 |
| 6,127,802 | A | * | 10/2000 | Lloyd et al. | ................. | 320/113 |
| 6,137,260 | A | * | 10/2000 | Wung et al. | ................. | 320/110 |

FOREIGN PATENT DOCUMENTS

| FR | 2763028 | * | 4/1998 |
| JP | A10293874 | | 11/1998 |

* cited by examiner

*Primary Examiner*—Edward H. Tso
*Assistant Examiner*—Pia Tibbits
(74) *Attorney, Agent, or Firm*—Birch, Stewart, Kolasch & Birch, LLP

(57) ABSTRACT

A battery exchange apparatus having a structure which allows a battery to be easily taken in or out of the battery exchange apparatus and to provide a small-size battery exchange apparatus suitable to be used in an indoor facility. The battery exchange apparatus has a plurality of slots, and batteries inserted in the slots are charged by chargers. The battery thus charged is rented to a user in accordance with instructions. Upon rental of the battery, a battery lock provided on a retaining mechanism is released, and the battery projects forwardly more than an adjacent battery not to be rented. The slot holding the battery includes a first interior section, innermost in the slot for securing the battery, and a second interior section that is wider than the first interior section. The second interior section allows a user to easily hold the end portion of the battery. Further, the battery itself has a palm-size cross-sectional shape, allowing a user to easily hold the battery.

11 Claims, 16 Drawing Sheets

BATTERY EXCHANGE APPARATUS

BACKGROUND OF THE INVENTION

1. Field of the Invention

The present invention relates to a battery exchange apparatus, and particularly to a battery exchange apparatus suitable for collectively controlling the charging and rental of a battery to be mounted on a motor-driven vehicle using a motor as a drive source. In addition, the present invention relates to a chargeable battery, and particularly to a chargeable battery mounted on a motor-driven vehicle as a power source of the motor-driven vehicle.

2. Description of Background Art

In recent years, a bicycle on which a motor is mounted as an auxiliary power source for assisting a force produced by the legs of a user (hereinafter, referred to as "a motor-assisted bicycle) has been available. A battery such as a nickel-cadmium battery that allows repetitive recharge is used as a power supply of the motor.

If a user of a motor-assisted bicycle possesses a battery personally, there occurs an inconvenience in that the charging of the battery must be performed by the user himself. To solve such an inconvenience, there may be considered a system for collectively controlling the charging of batteries. For example, there may be considered a battery exchange system for a user of a motor-assisted bicycle in such a manner that the user rents a battery from the system that collectively controls the batteries, returns the battery after the battery is exhausted, and rents a new full-charged battery.

Japanese Patent Laid-open No. Hei 10-293874 discloses a battery exchange apparatus for automatically renting a battery to a registered user and for receiving the returned battery from the user. By deploying such battery exchange apparatuses at a number of locations, it is possible to solve the inconvenience of the battery management in which a user must perform the charging, storage, and the like of the battery and also to utilize a motor-assisted bicycle in a wide range with no attention paid to exhaustion of the battery.

The installation of the above-described battery automatic exchange apparatus is very convenient, and therefore, a number of persons will come to use the exchange apparatus. Under such circumstances, it is required that many and unspecified persons can easily operate the battery exchange apparatus. In particular, it is essential to improve the operability upon taking out a relatively heavy battery of the battery exchange apparatus.

The above-described automatic battery exchange apparatus has a structure suitable to be used in an outdoor facility in order to enhance the convenience of a user in the course of cycling on a vehicle such as a motor-assisted bicycle. However, in consideration of the applicability of the battery exchange apparatus and comfortableness for use by a user, the installation of the battery exchange apparatus in an indoor facility should be examined. The battery exchange apparatus adapted to be used in an outdoor facility, however, requires an air conditioning system for allowing the battery exchange apparatus to keep up with various environmental conditions such as a particular installation area, weather, and climate and for removing heat generated upon charging the battery. As a result, there occurs a problem that the battery exchange apparatus is enlarged and is not suitable to be used in an indoor facility.

The prior art battery is provided with a handle for allowing a user to easily carry the battery, or formed into a shape and a size suitable for the battery to be mounted on a motor-assisted bicycle or the like. The prior art battery, however, fails to consider the containment of the battery in a battery exchange apparatus collectively controlled as described above, or the workability and usability in handling the battery, particularly, when containing the battery in the battery exchange apparatus.

SUMMARY AND OBJECTS OF THE INVENTION

An object of the present invention is to solve the above-described problem and to provide a battery exchange apparatus capable of easily taking a battery out of the battery exchange apparatus.

To achieve the above object, according to a first feature of the present invention, there is provided a battery exchange apparatus having a containing portion for containing an approximately square pole shaped battery, and a charger for charging the battery, characterized in that the containing portion is configured as a cylindrical body with a bottom capable of containing the battery in the longitudinal direction; and the containing portion includes a first interior section for retaining the battery, and a second interior section which is spread from the first interior section to the opening portion side of the cylindrical body to allow one end of the battery contained in the containing portion to project from the second interior section.

According to a second feature of the present invention, in addition to the configuration of the first feature, the battery exchange apparatus includes: lock means for locking the battery in the cylindrical body with a bottom at a position near a bottom portion thereof; and lock releasing means for releasing the locking by the lock means and projecting the battery to the opening portion side more than another battery adjacent to the battery.

According to a third feature of the present invention, in addition to the configuration of the first or second feature, a plurality of the cylindrical bodies with bottoms are arranged in the vertical and horizontal directions; and a door is provided commonly to each group of the plurality of cylindrical bodies arranged in both the vertical or horizontal direction. Furthermore, according to a fourth feature of the present invention, in addition to the configuration of any one of the first, second and third features, the battery to be contained in the containing portion is formed into an approximately rectangular shape in transverse cross-section, and the short side of the battery has a palm size.

With the first feature, since one end of the battery contained in the containing portion projects in the second interior section, it is possible for a user to easily hold the one end of the battery and hence to easily take the battery in or out of the battery exchange apparatus. With the second feature, since the battery projects more than other batteries adjacent thereto when the locking is released by the lock releasing means, it is possible for a user to more easily hold the one end of the battery.

With the third feature, it is possible to take necessary batteries in or out of those of a plurality of the containing portions arranged in each row or in each stage by opening the door provided for those of a plurality of the containing portions arranged in each row or in each stage. With the fourth feature, it is possible to improve the workability in taking the battery in or out of the battery exchange apparatus as its configuration allows the user to easily hold the battery.

Another object of the present invention is to provide a small-size battery exchange apparatus suitable to be used in an indoor facility.

To achieve the above object, according to an additional feature of the present invention, there is provided a battery exchange apparatus for providing an already charged battery, the battery exchange apparatus having a containing portion for containing batteries and a charger for charging each of batteries, characterized in that the battery exchange apparatus is installed in an indoor facility, and an atmosphere in the battery exchange apparatus is maintained depending only on ventilation with an atmospheric air in the indoor facility; and the total height of the battery exchange apparatus is set to be in a range of 80 to 120 cm. With this first feature, the battery exchange apparatus of the invention is suitable to be used in an indoor facility. In particular, since the total height is set to be in a range of 80 to 120 cm approximately, a battery can be easily inserted in or removed from the containing portion, and the upper surface of the exchange apparatus can be effectively used as a surface on which an article is to be placed.

According to a further feature of the present invention, the number of batteries arranged in the horizontal direction in the battery containing portion is larger than that of batteries arranged in the vertical direction in the battery containing portion. With this second feature, although the height of the apparatus is set at a value being as low as about 120 cm, the number of batteries contained in the containing portion can be increased.

According to a still further feature of the present invention, the battery exchange apparatus includes a power-supply unit and a control unit; and the control unit includes a lock control means for retaining a battery received in the containing portion, a charging control means for charging the battery received in the containing portion, and a lock releasing means for releasing the battery, which has been charged, that is retained by the containing portion in accordance with a user's demand. With this third feature, the received battery is locked in the containing portion, on the other hand, the locking state of an already charged battery is released and the already charged battery is taken out of the containing portion.

According to another feature of the present invention, the containing portion includes a plurality of cylindrical bodies with bottoms; and the battery exchange apparatus includes a display means for recognizably displaying those in a vacant state and those in the state containing charged batteries of the plurality of cylindrical bodies with bottoms. With this fourth feature, a user can recognize the presence or absence of batteries in the containing portion and the presence or absence of an already charged battery by means of the display means.

According to an additional feature of the present invention, the power-supply unit and the control unit are disposed in the lowermost stage; the containing portion is disposed in an intermediate stage; and a guiding means including the display means is disposed in the uppermost stage. With this additional feature, the guiding means is disposed to an easy-to-view position, and a battery is disposed at an easy-to-reach position.

According to a still further feature of the present invention, the battery exchange apparatus includes a fan for ventilating the inner atmosphere of the battery exchange apparatus. With this feature, the inner atmosphere is ventilated with atmospheric air at a location where the battery exchange apparatus is installed. According to another feature of the present invention, the indoor facility is a convenience store. With this still further feature, since the height of the battery exchange apparatus is set to a value 120 cm, even if the apparatus is arranged together with other commodities on shelves, it is possible to ensure a high visibility of the interior of the store when it is installed in combination with other article show cases and to desirably place an article or product on the upper surface of the exchange apparatus.

An additional object of the present invention is to solve the above-described problem and to provide a chargeable battery suitable to be contained in a battery exchange apparatus.

To achieve the above object, according to the present invention, there is provided a chargeable battery used for a battery exchange apparatus capable of exchanging an exhausted battery for an already charged battery, the chargeable battery being composed of a plurality of battery cells contained in an approximately square pole shaped battery pack, characterized in that the battery pack is formed into an approximately rectangular shape in transverse cross-section, and the short side of the approximately rectangular shape has a palm size. The battery pack is approximately symmetrical with respect to a parting plane set at a position bisecting the short side. The battery pack has an engagement hole to be engaged with locking means moved forward and backward with respect to a plane including the short side, the engagement hole being formed symmetrically with respect to the parting plane.

With this feature, since the battery has a palm size, it is possible for a user to easily carry the battery without the provision of any additional member such as a handle. As a result, it is possible to improve the operability not only in mounting or dismounting the battery on or from a motor-assisted bicycle but also in taking the battery in or out of a battery exchange apparatus for charging the battery. Since the battery has no portion projecting outwardly from the outer surface thereof, it is possible to simplify the shape of a battery containing portion of a battery exchange apparatus. Since the engagement hole is formed in the battery pack, if locking means is provided on a battery exchange apparatus, the battery can be certainly held by engaging the locking means with the engagement hole. Since the battery pack is formed symmetrically with respect to the parting plane, it is possible to reduce the steps of designing a mold used for production of the battery pack by molding.

According to another feature of the present invention, the chargeable battery has a pair of terminals connected to the battery cells; and the pair of terminals are disposed on one end in the longitudinal direction of the approximately square pole shaped battery pack in such a manner as to be symmetrical with respect to the parting plane, and are held by the battery pack. With this feature, it is possible to more easily form the symmetrical battery pack, and hence to promote the first feature.

According to a further feature of the present invention, a second engagement hole is formed in a surface opposed to the surface in which the engagement hole is formed; and the engagement hole and the second engagement hole are set to be fitted to an adapter for supplying power to equipment which uses the battery as a power source. With this configuration, in the case of connecting the battery to equipment using the battery as a power source via an adapter, the adapter can be certainly held by the engagement hole provided in the surface, facing to the adapter, of the battery pack.

According to a still further feature of the present invention, projecting stripes extending in the longitudinal direction of the battery pack are formed on the surface opposed to the surface in which the engagement hole is formed in such a manner as to be symmetrical with respect to the parting plane. With this feature, since the surface, on which the projecting stripes are formed, of the battery pack is easily brought into slide-contact with another member, for example, with a battery containing portion of a battery exchange apparatus, it is possible to improve the operability in taking the battery in or out of the battery containing portion.

According to another feature of the present invention, a design seal is stuck between the projecting stripes symmetrically formed. According to this feature of the present invention, the design seal is a seal providing a notification that a battery is recyclable. Since the design seal is protected by the projecting stripes, it is prevented from being damaged or contaminated. In addition, it is possible to easily inform a user that the battery is a recyclable product.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
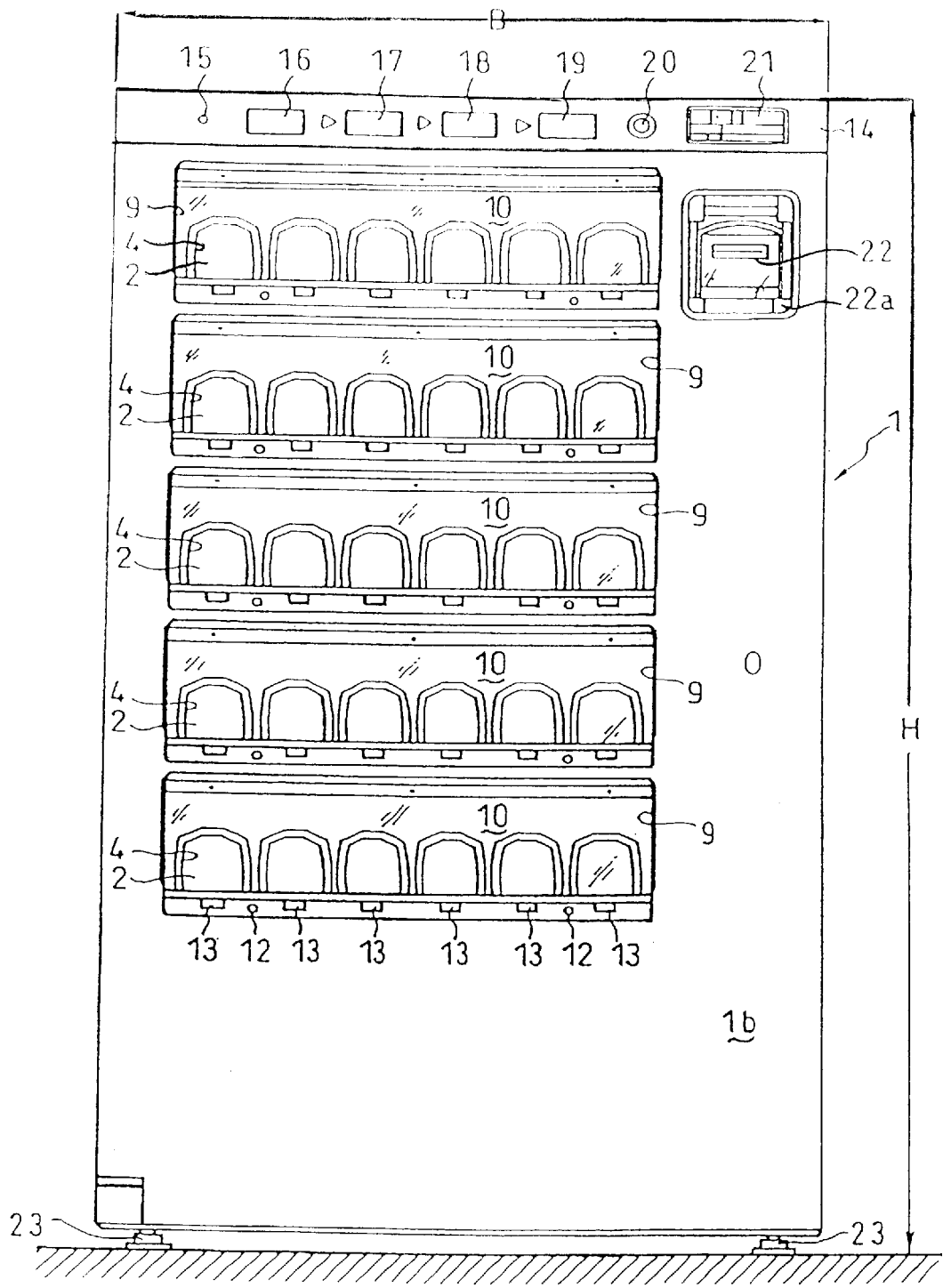
FIG. 1 is a front view of a battery exchange apparatus according to one embodiment of the present invention.
Figure 2:
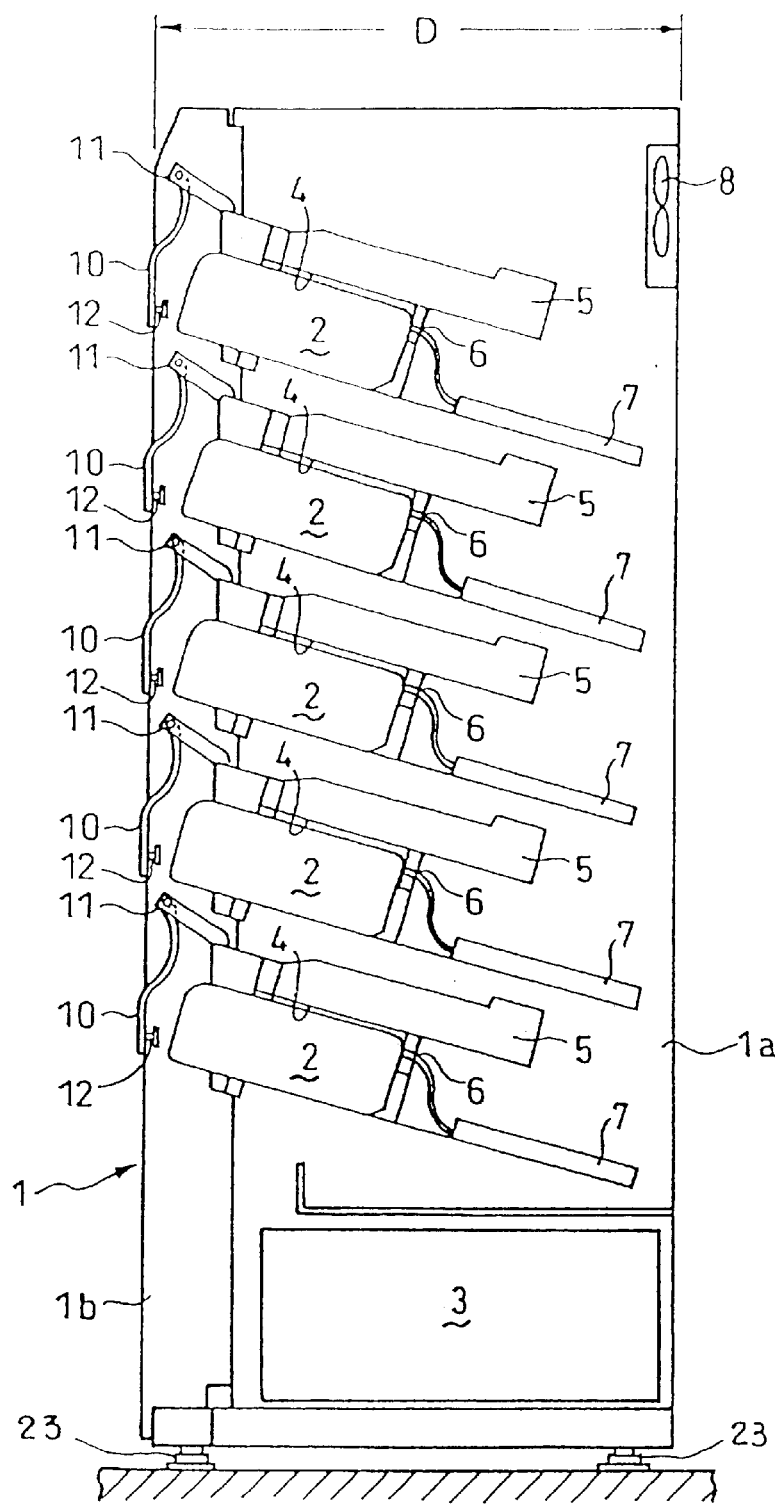
FIG. 2 is a sectional side view of the battery exchange apparatus according to the embodiment of the present invention.

Hereinafter, the present invention will be described with reference to the drawings. FIG. 1 is a front view showing a battery exchange apparatus for charging a battery according to one embodiment of the present invention, and FIG. 2 is a sectional side view of the battery exchange apparatus shown in FIG. 1. Referring to FIGS. 1 and 2, a battery exchange apparatus 1 is configured as a rectangular parallelopiped container. The container has a main body 1 a having a space for containing a plurality of batteries 2 and a controller (including a power-supply unit and a control unit) 3, and a lid 1b eopenable/closable to the main body 1a. The battery 2 is configured as a battery pack including a resin case and a plurality of battery cells loaded in the resin case.

The main body 1a includes slots 4 as containing portions in each of which one battery 2 is to be contained. In this embodiment, the slots 4 are arranged in a pattern of six columns (in the horizontal direction)×five stages (in the vertical direction). In other words, the battery exchange apparatus 1 according to this embodiment is allowed to simultaneously contain 30 batteries in total. The slot 4 has a retaining mechanism 5 for retaining the battery 2 (which will be described later). A terminal 6 for charging the battery is provided on a bottom portion, that is, the bottomed wall surface of the slot 4. The terminal 6 is connected to a charger 7.

The slot 4 has a sensor means (configured as a limit switch 56 to be described later) for detecting the insertion of the battery 2. When the insertion of the battery 2 is detected, the charger 7 is energized to charge the battery 2. The instruction to start the detection and charging of the battery 2 is executed by the controller 3. The control unit in the controller 3 has a control means including a register capable of recognizing which slot 4 contains the battery 2 having been already charged. The charged batteries are displayed on a display means to be described later on the basis of the content stored in the resister. The chargers 7 are not necessarily provided for each slot 4, but may be each shared between a plurality (for example, three) of slots 4.

An exhaust fan 8 is provided on the back surface of an upper portion of the main body 1a. If an air conditioning means is provided in the battery exchange apparatus 1, it requires a large space for the air conditioning means. This is not suitable for the use of the battery exchange apparatus 1 indoors. From this viewpoint, according to this embodiment, the air conditioning means requiring a large space is not provided, but the fan 8 is provided only for ventilation of outside air (atmospheric air at the installation location). Consequently, as will be described later, the miniaturization of the battery exchange apparatus 1 can be achieved.

The lid 1b is provided with windows 9, which are each elongated in the horizontal direction along with the arrangement of the slots 4 in each stage, and which are arranged in five stages in the vertical direction in such a manner as to correspond to the slots 4 in the five stages in the vertical direction. The window 9 has a door 10 for commonly covering the front surfaces of the six slots 4 contained in each stage. The door 10 is formed of a transparent resin plate, and is openably/closably supported by a hinge 11 provided at an upper portion of the door 10. An edge of the window 9 has stoppers 12. When the door 10 is closed, the back surface of a lower end portion of the door 10 comes in contact with the stoppers 12. The stopper 12 is preferably made from an elastic material having a damping function, such as rubber. The window 9 has indicating lamps (for example, LEDs) 13 provided for each of the slots 4. The slot 4 whose indicating lamp 13 lights up or flashes indicates that the battery 2 is contained in the slot 4, to which a user can make access. In FIG. 1, for an easy understanding, the stoppers and indicating lamps for the slots 4 in the lowermost stage are designated by reference numerals 12 and 13.

The number of the slots 4 for containing the batteries 2 is not limited to that described above. The shape of the window 9 is not limited to the shape elongated in the horizontal direction in such a manner as to contain the slots 4 in each stage, but may be a shape elongated in the vertical direction along with the arrangement of the slots in each column. In this case, the door 10 is configured to be elongated in the vertical direction and be preferably supported by a hinge having a turning axis extending in the vertical direction. Further, the openable/closable doors 10 may be provided only for the necessary windows 9 containing the slots 4. In other words, provided that the number of the slots 4 is few, if any of the windows 9 do not contain the slots 4, it may be closed with a lid, and if such a window 9 is additionally provided with the slots 4, it may be additionally provided with the door 10.

A display panel 14 is formed on the upper portion of the lid 1b and includes a power-supply lamp 15, a preparation state display 16, operational procedure displays 17, 18, and 19, a card return lamp 20, and a card's residual usage count display 21. Each of the preparation state display 16 and the operational procedure displays 17, 18 and 19 is composed of a character plate on which a message is previously written, and a lamp for lighting up the character plate. Characters "Under Preparation" are displayed on the preparation state display 16; characters "Insert Battery Into Slot With Light-on" are displayed on the operational procedure display 17; characters "Insert Card" are displayed on the operational procedure display 18; and characters "Take Battery Out Of Slot With Flashing" are displayed on the operational procedure display 19. An insertion port 22 in which a prepaid card is to be inserted is formed next to the uppermost stage window 9 on the lid 1b. An openable/closable transparent resin cover 22a may be provided to cover the insertion port 22.

Legs 23 are provided on the bottom portion of the battery exchange apparatus 1. The battery exchange apparatus 1 has a height H of 120 cm, a depth D of 45 cm, and a width B of 72.5 cm. Of these dimensions, the height H may be desirable to be determined in consideration of the easy-to-load/unload the battery 2 from the human engineering viewpoint, of high visibility of the battery exchange apparatus 1 when it is installed in a store such as a convenience store, and the beautiful sight of the battery exchange apparatus 1 when it is installed in combination with other article show cases. To be more specific, the height H is preferably in a range of about 110 cm to 130 cm, preferably in a range of about 80 cm to 120 cm.

The operation of the battery exchange apparatus 1 will be described below. If the battery exchange apparatus 1 does not contain the already charged battery 2 at all, the preparation state display 16 is turned on to display the characters "Under Preparation". If the battery exchange apparatus 1 is in the rental permissible state in which the already charged battery 2 is ready, the preparation state display 16 is turned off to delete the characters "Under Preparation", and instead the operational procedure display 17 is turned on to display the characters "Insert Battery Into Slot With Light-on". At the same time, the indicating lamp 13 corresponding to a vacant slot 4 is turned on. If there are a plurality of vacant slots 4, the indicating lamps 13 corresponding thereto may be all turned on, or one of the open slots 4 may be selected in consideration of equality in usage frequency of respective slots, and the indicating lamp 13 corresponding thereto may be turned on.

Figure 3:
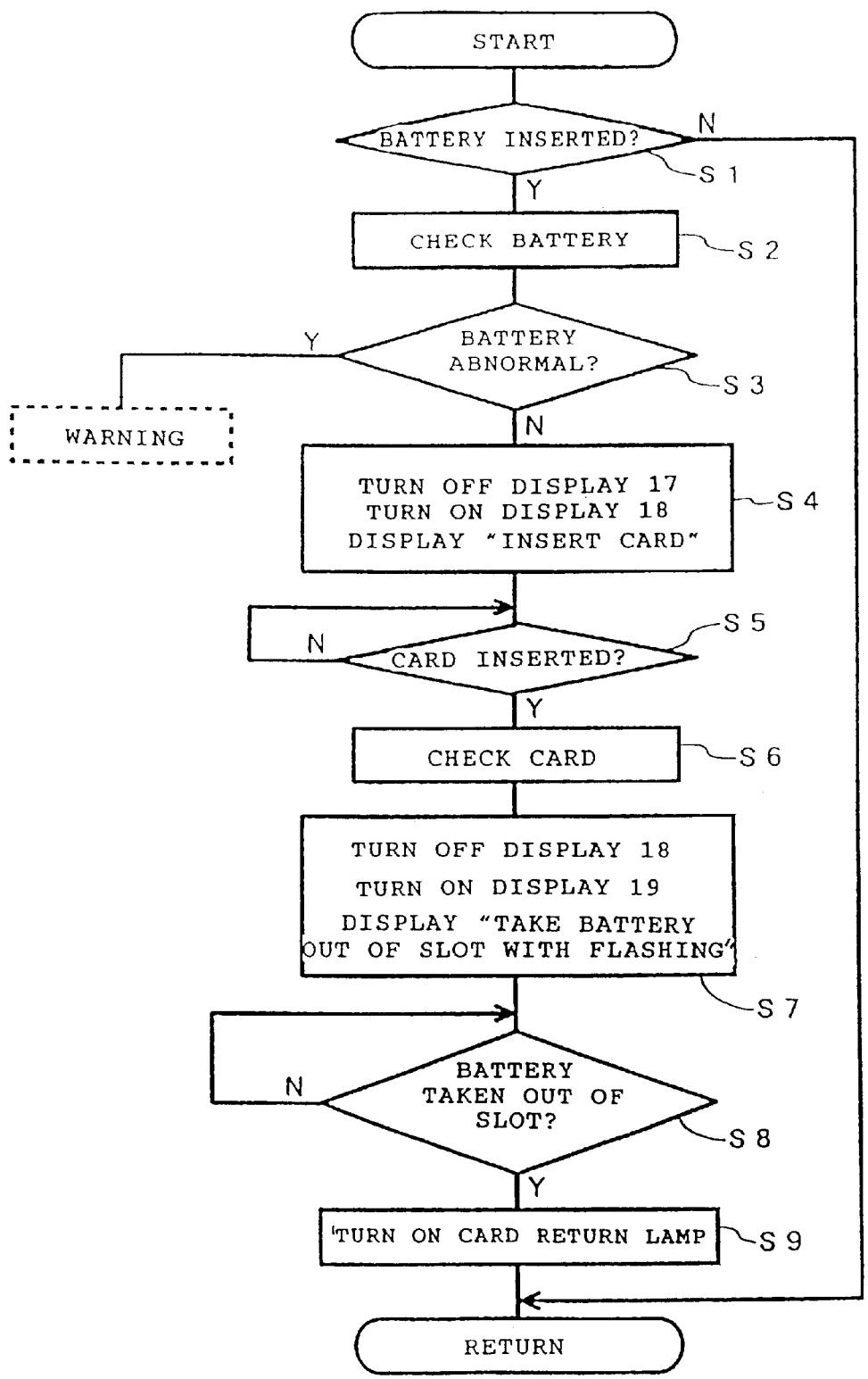
FIG. 3 is a flowchart for carrying out the exchange of a battery.

FIG. 3 is a flowchart showing a battery exchange process. The process is executed by the control unit (including a microcomputer) in the controller 3. At Step S1, it is decided whether or not the battery 2 is inserted in the slot 4. If the battery 2 is inserted in the slot 4, the process goes on to Step S2 at which it is checked whether or not the battery thus received is genuine. If the battery 2 is genuine, and further if it is decided that the battery 2 is not abnormal at Step S3, the process goes on to Step S4. In addition, a warning lamp turned on to give a warning to a user when the battery 2 is abnormal may be provided on the lid 1b.

At Step S4, the operational procedure display 17 is turned off and the operational procedure display 18 is turned on, to delete the characters "Insert Battery Into Slot With Light-on" and instead display the characters "Insert Card". At Step S5, it is decided whether or not the prepaid card is inserted in the insertion port 22. If the prepaid card is inserted in the insertion port 22, the process goes on to Step S6 at which the card thus inserted is checked. To be more specific, it is decided whether or not the received card agrees with the battery exchange apparatus 1 and also satisfies the predetermined rental condition. If it is decided that the received card is correct, a necessary fee is subtracted from the present number (indicating the present amount of money) of the card and the residual number of the card is displayed on the card's residual usage count display 21.

At Step S7, the operational procedure 18 is turned off and the operational procedure display 19 is turned on, to delete the characters "Insert Card" and instead display the characters "Take Battery Out Of Slot With Flashing". At the same time, the indicating lamp 13 corresponding to the slot 4 containing the already charged battery 2 flashes.

If there are a plurality of the already charged batteries 2, the indicating lamps 13 corresponding thereto may be operated to all flash, or one of the slots 4 is selected at random in order for all of the slots 4 to be used equally, and the indicating lamp 13 corresponding thereto may be operated to flash. At Step S8, it is decided whether or not the battery 2 is taken out of the slot 4. If the battery 2 is taken out of the slot 4, the process goes on to Step S9 at which the card return lamp 20 is turned on, to return the card.

In the above-described example, the prepaid card is used for utilizing the battery exchange apparatus 1; however, the exchange of the battery 2 may be configured to be permitted only under the use of an ID card previously issued only for a registered user.

Figure 4:
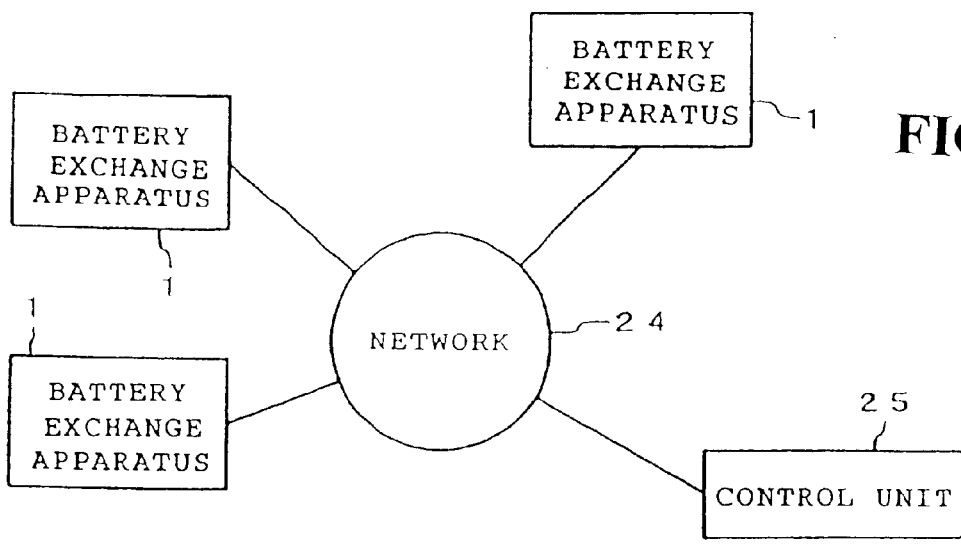
FIG. 4 is a configuration view of a battery rental system.

A plurality of battery exchange apparatuses 1 may be collectively controlled. FIG. 4 is a configuration of a battery rental system for collectively controlling a plurality of battery exchange apparatuses 1. The battery exchange apparatuses 1 are connected to a control unit 25 via a net work 24. The control unit 25 collectively controls a plurality of the battery exchange apparatuses 1 installed, for example, in convenience stores. A user makes a contract with a system provider for user registration, and receives the issued ID card. When an ID card is used, the battery exchanged apparatus 1 recognizes information stored in the ID card, checking the personal information of the user via the communication with the control unit 25, and then receives the returned battery 2 and rents a new battery 2 in return. Such a battery rental system has been described in detail in the early application (Japanese Patent Laid-open No. Hei 10-293874) by the present inventor. The exchange of a battery may be performed not only by the prepaid card or ID card but also by paying in cash.

Figure 5:
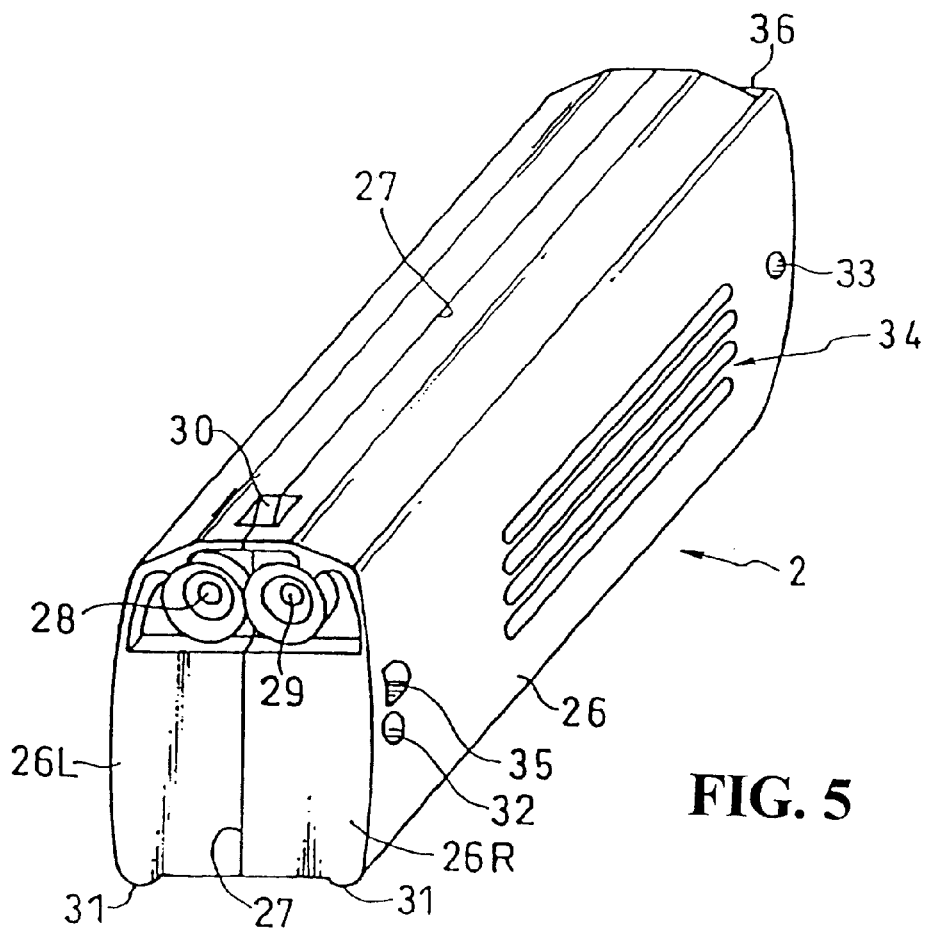
FIG. 5 is a perspective view of the battery.
Figure 6:
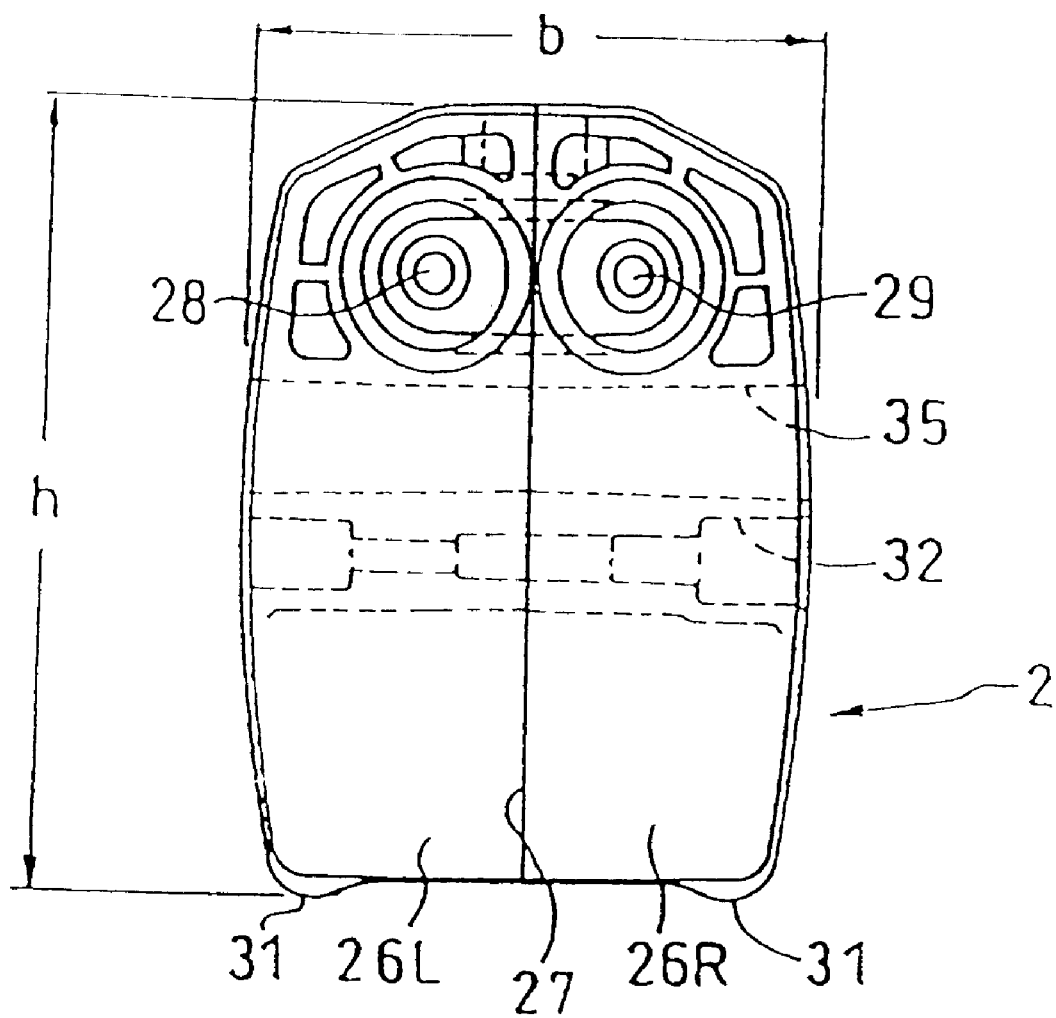
FIG. 6 is a front view of the battery.
Figure 7:
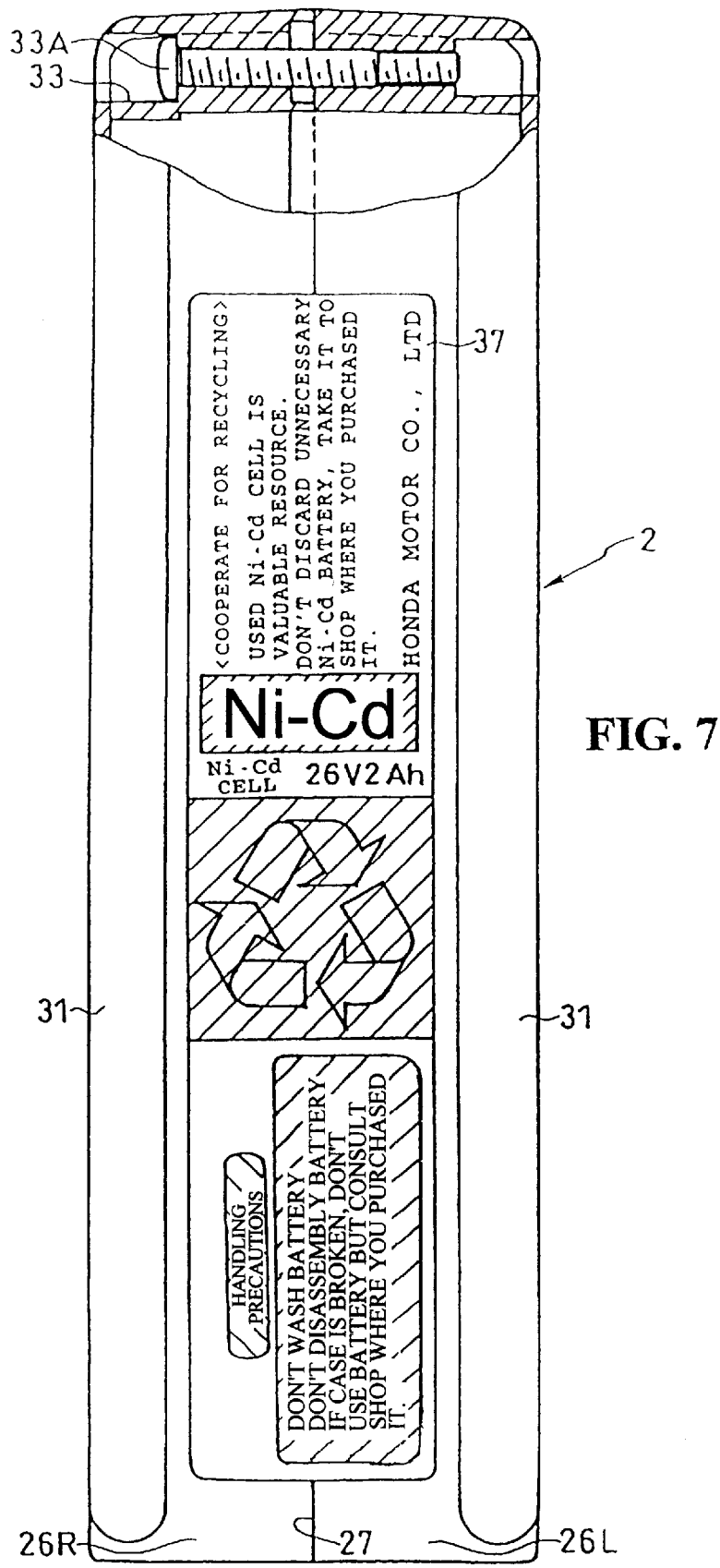
FIG. 7 is a bottom view of the battery.

Referring to these FIGS. 5, 6 and 7, the battery 2 has a plurality of battery cells (not shown), and an approximately rectangular parallelopiped battery pack 26 for containing the battery cells. The battery pack 26 is divided along a division plane 27 extending in the longitudinal direction into pack portions 26R and 26L. These pack portions 26R and 26L are formed symmetrical with respect to the division plane 27. Such that the symmetrical arrangement of the pack portions 26R and 26L is effective to facilitate the mold design for the pack portions 26R and 26L, that are formed by molding.

Terminals 28 and 29 to be connected to positive electrodes and negative electrodes of the battery cells, respectively, are disposed on the front surface of the battery 2 in such a manner as to be exposed at positions symmetrical with respect to the division plane 27. An engagement hole 30 to be locked with a locking device (which will be described later) provided for the slot 4 is formed in a top portion on the front side of the battery pack 26. To ensure the sliding characteristic of the battery 2 against the wall surface of the slot 4 when the battery 2 is contained in the slot 4 and the stability of the battery 2 after the battery 2 is contained in the slot 4, two projecting stripes 31 extending in the longitudinal direction are formed on the bottom surface of the battery pack 26.

The pack portions 26R and 26L can be integrally assembled with each other by screwing bolts 33A (see FIG. 7) in threaded holes 32 and 33. Grooves 34 allow a user to easily hold the battery pack 26 with his hand when the user carries the battery pack 26. That is to say, the provision of the grooves 34 contributes to the portability of the battery pack 26. The size of the transverse cross-sectional shape of the battery pack 26 may be also set to a size equivalent to that of an average palm's width in order to allow a user to easily hold the battery pack 26 with his hand. For example, when seen from the front side, the battery pack 26 has a height "h" of about 80 mm, and a width "b" of about 55 mm which is equivalent to the average palm's width of an average adult man or woman.

The battery pack 26 has a hole 35 extending through the battery pack 26 in the transverse direction. When the battery 2 is mounted on a motor-assisted bicycle, a wire or rope portion taken as part of a key is allowed to pass through the hole 35. A stepped portion 36 formed at each corner of the battery pack 26 is taken as a hook which is used, when the battery 2 is mounted on a motor-assisted bicycle, to fix the battery 2 to a vehicular body. An example in which the battery 2 is mounted on a motor-assisted bicycle will be described later particularly with reference to FIG. 17. A seal (design seal) 37, on which the kind of the battery 2, the maker's name, the sign for handling caution, and the like are written, is stuck on the bottom surface of the battery pack 26 in a region surrounded by the projecting stripes 31. The sticking of the seal 37 in the region between the projecting stripes 31 is advantageous in that the seal 37 is protected from being damaged by the projecting stripes 31 when the battery 2 is inserted in or taken out of the slot 4.

Figure 8:
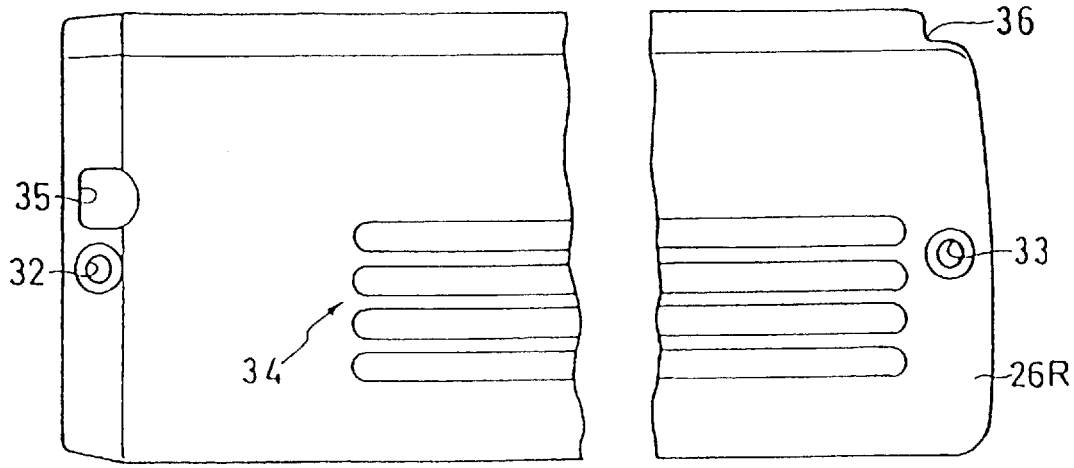
FIG. 8 is a side view of a pack portion of a battery pack.
Figure 9:
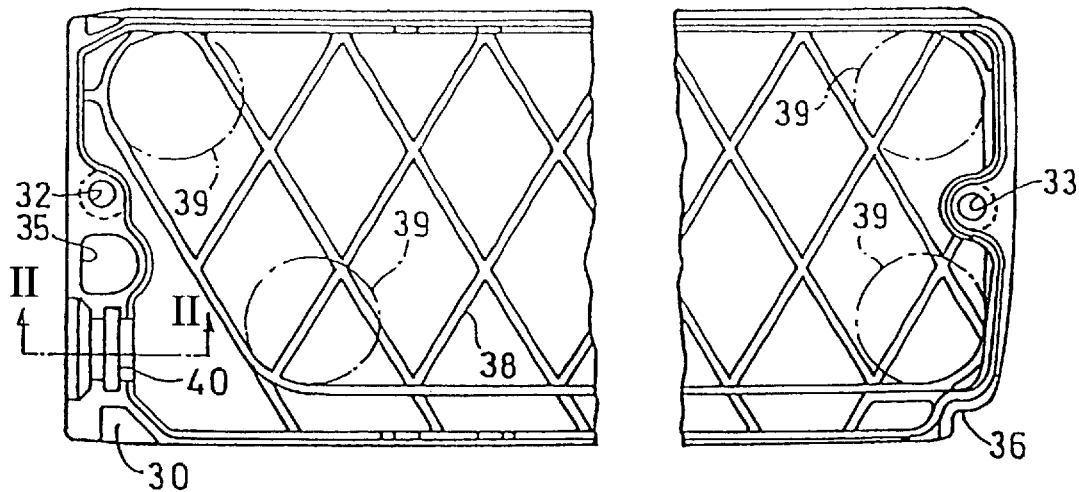
FIG. 9 is a view showing an inner side of the pack portion.
Figure 10:
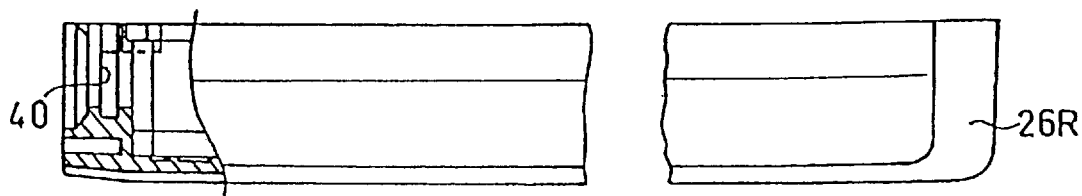
FIG. 10 is a sectional view taken on line II—II of FIG. 9.

The shape of the battery pack 26 will be more fully described. It should be noted that in the following description, only the pack portion 26R is exemplified because the pack portions 26R and 26L are symmetrically formed. In FIGS. 8, 9 and 10, parts corresponding to those in FIG. 5 are designated by the same characters. Referring particularly to FIGS. 9 and 10, ribs 38 are formed on the inner surface of the pack portion 26R for reinforcing the pack portion 26R, and positioning and cushioning battery cells 39 contained in the pack portion 26R. Needless to say, the shape of the rib 38 is not limited to that shown in the figures.

In FIG. 9, only four pieces of the battery cells 39 are shown by imaginary lines. However, the battery cells 39 having a number greater than four, as shown, are actually loaded in the battery pack 26. The battery cell 39 is integrally formed by a heat contraction tube or the like and loaded in the battery pack 26. A multi-step groove 40 for fixing the above-described terminal 29 is formed on the wall surface on the front side of the pack portion 26R.

Figure 11:
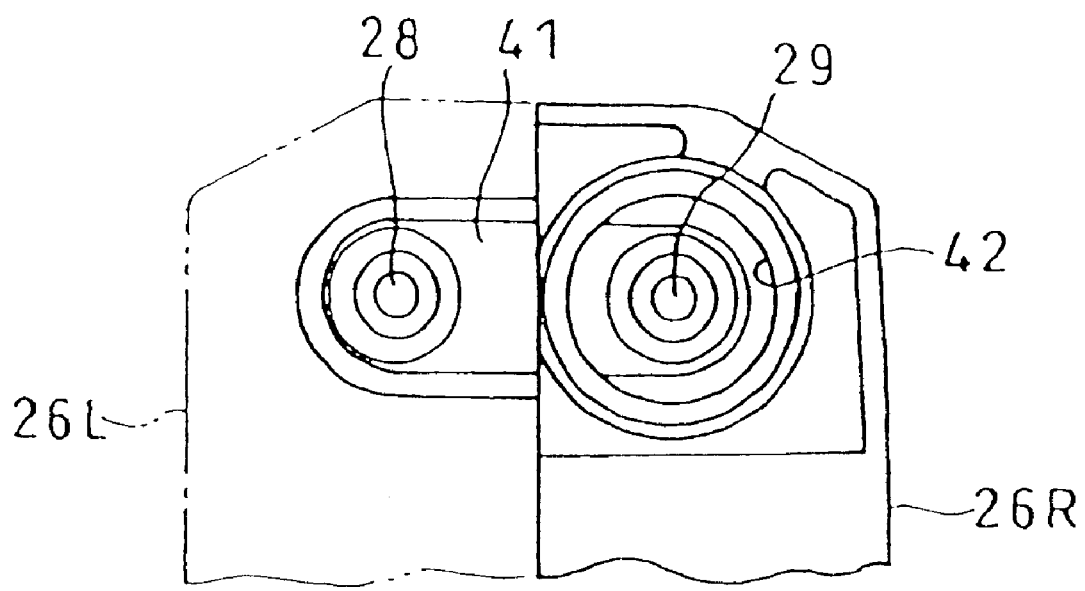
FIG. 11 is a front view showing an essential portion of the battery pack
Figure 12:
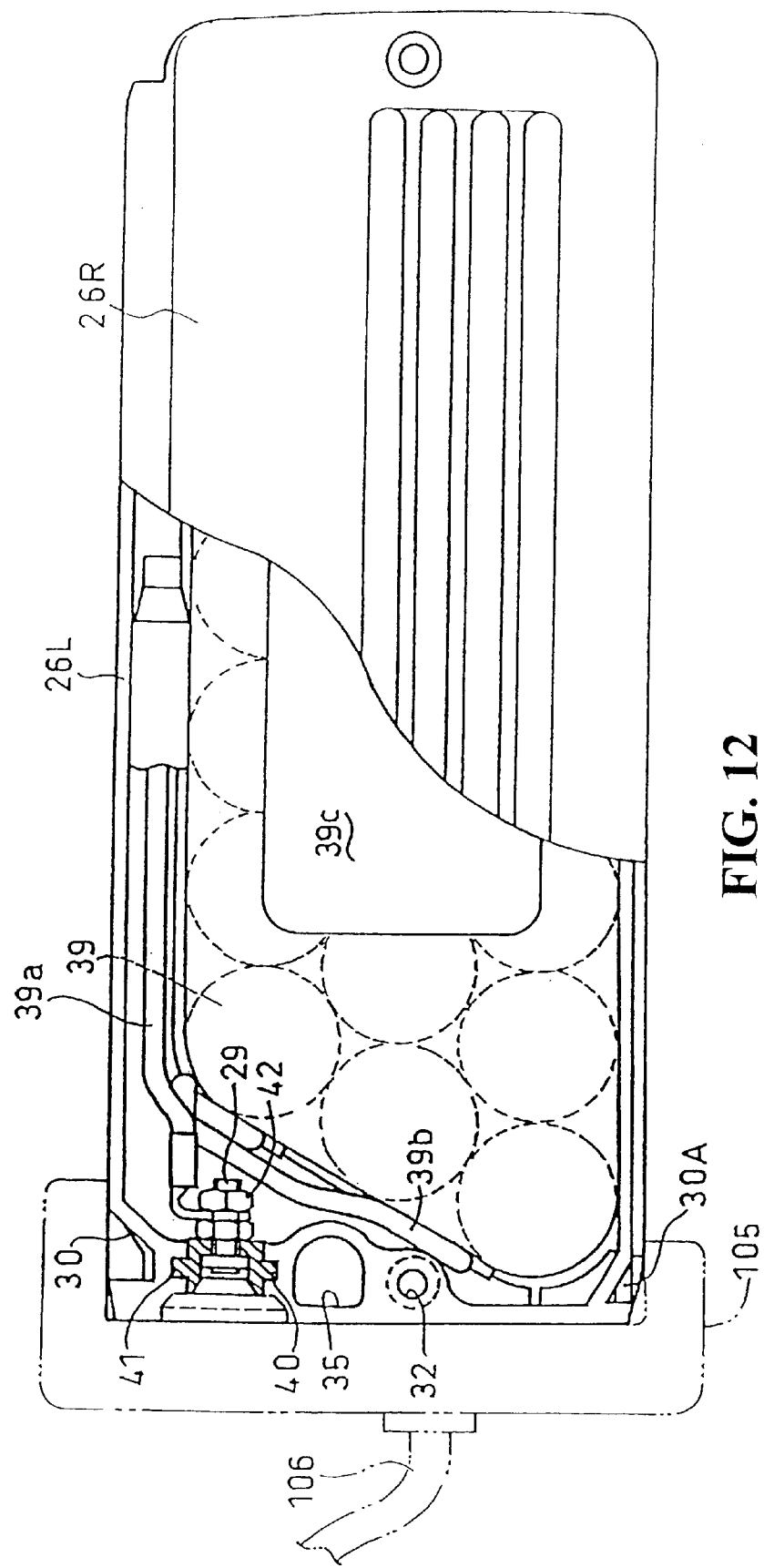
FIG. 12 is a sectional view showing an essential portion of the battery pack.

The terminal of the battery 2 and its neighborhood will be more fully described. FIG. 11 is a front view of an essential portion of the battery pack 26, and FIG. 12 is a sectional view of an essential portion of the battery pack 26. The terminals 28 and 29 are assembled to a resin made attachment 41 with a specific gap put therebetween. The terminals 28 and 29 have threaded portions to which nuts 42 are screwed for fastening cables 39a and 39b to the terminals 28 and 29. The cables 39a and 39b connect the terminals 28 and 29 to the battery cells 39.

The attachment 41 is fitted in the multi-step grooves 40 of the pack portions 26R and 26L, and is fixed while being held therebetween. End portions of the terminals 28 and 29 are exposed to the outside through holes of the pack portions 26R and 26L. A cushion 39c made from an elastic material such as rubber is interposed between the battery cells 39 and the pack portion. The battery pack 26 can be provided with, in addition to the above-described engagement hole 30 to be engaged with a lock rod (which will be described later) of the slot 4, an engagement hole 30A on the surface, opposed to the surface in which the engagement hole 30 is formed. The functions of the engagement holes 30 and 30A will be described later.

Figure 13:
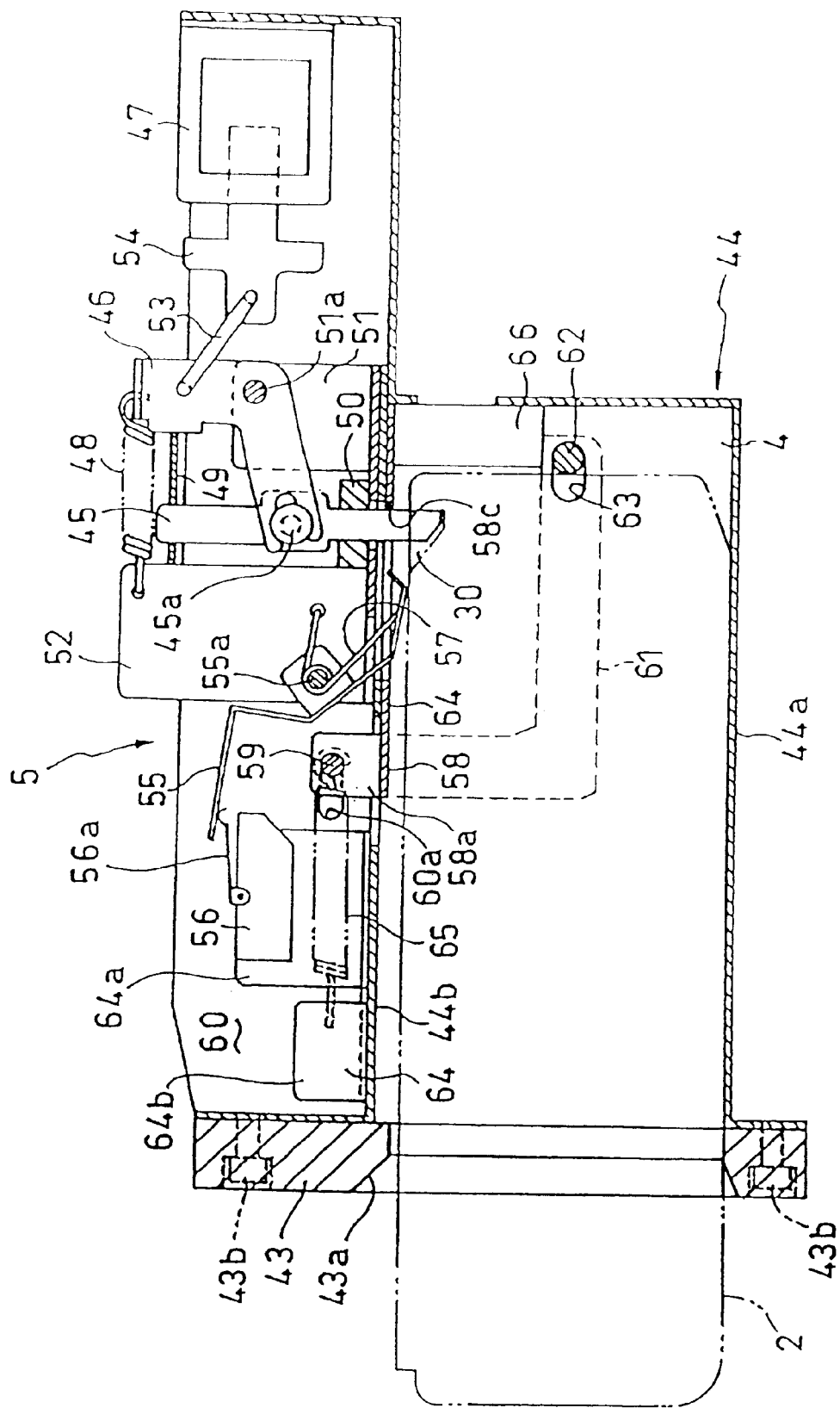
FIG. 13 is a side view of a slot.
Figure 14:
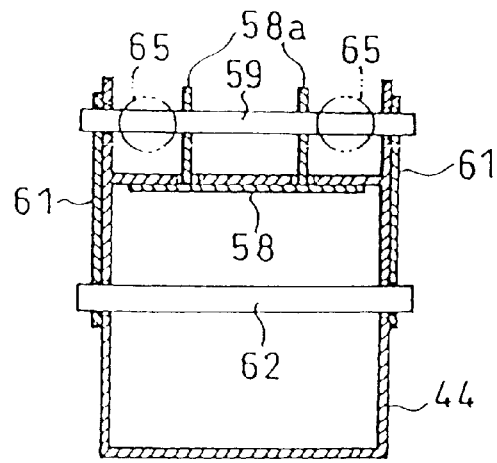
FIG. 14 is a transverse sectional view showing an essential portion of the slot.
Figure 15:
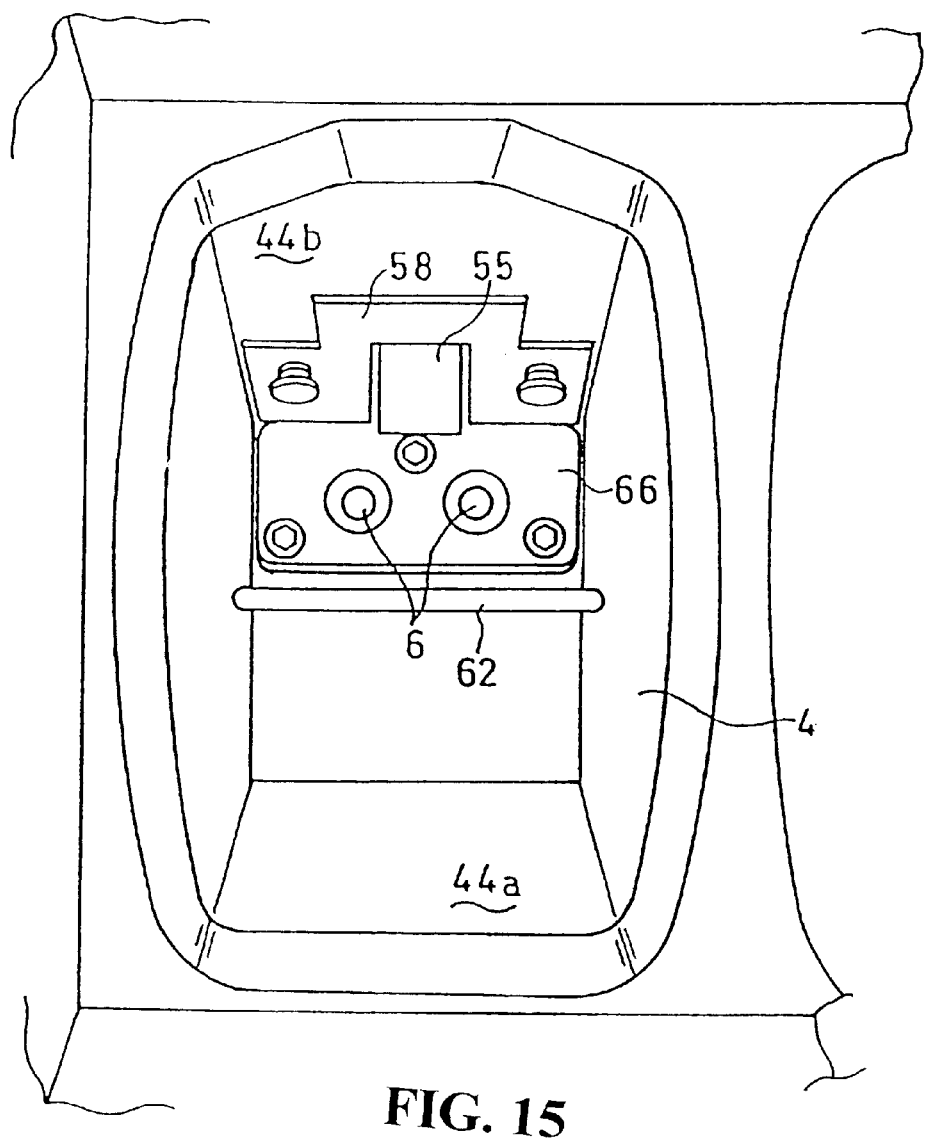
FIG. 15 is a perspective view showing the inner surface of the slot.

The structure of the slot 4 will be described below. Referring to FIGS. 13 to 15, the slot 4 includes an inlet member 43 having a taper 43a for making easy the insertion of the battery 2. The inlet member 43 is fixed to a slot main body 44 formed of a metal plate with bolts 43b. The slot main body 44 is composed of a lower plate 44a for ensuring a space in which the battery 2 is to be contained and an upper plate 44b. The upper plate 44b serves as a base on which the battery retaining mechanism 5 is to be mounted. The upper plate 44b has a lock rod 45 movable in the vertical direction, an arm 46 for moving the lock rod 45 in the vertical direction, a solenoid 47 for biasing the arm 46 in one direction, and a tensile coil spring 48 for biasing the arm 46 in the direction opposed to the biasing direction by the solenoid 47.

The lock rod 45 is vertically movably supported by members 49 and 50, and the arm 46 is turnably supported by a member 51 via a pivot 51a. One end of the arm 46 is forked into a U-shape, and the U-shaped end of the arm 46 is engaged to a pin 45a of the lock rod 45. One end of the tensile coil spring 48 is caught by the other end of the arm 46, and the other end of the tensile coil spring 48 is caught by a member 52. One end of a connection rod 53 is caught by an intermediate portion between the pivot 51a and the catching portion at the one end of the tensile coil spring 48. The other end of the connection rod 53 is caught by a plunger 54 of the solenoid 47.

A swing plate 55 supported by a pivot 55a is provided on the member 52. One end of the swing plate 55 is allowed to be brought into contact with an actuator 56a of a limit switch 56 and the other end of the swing plate 55 is allowed to be brought into contact with the upper surface of the battery 2 inserted in the slot 4. In addition, the other end of the swing plate 55 is biased to the battery 2 side by a torsion coil spring 57.

A plate 58 slidable on the upper plate 44b is provided, and a shaft 59 is engaged with the plate 58 in such a manner as to pass through an upright plate 58a of the plate 58. Both ends of the shaft 59 are engaged in long holes 60a provided in side plates 60 of the upper plate 44b. One end of a bracket 61 is connected to an end portion, projecting outwardly from each long hole 60a, of the shaft 59. A push bar 62 passing through the lower plate 44a in such a manner as to cross the slot 4 in the transverse direction is connected to the other ends of the brackets 61. The push bar 62 is guided along guide grooves 63 recessed in side plates of the lower plate 44a in such a manner as to be movable in the insertion/removal direction of the battery 2 in the slot 4.

The above limit switch 56 is mounted on one upright plate 64a of a plate 64 fixed on the upper plate 44b. One end of a tensile coil spring 65 is caught by the other upright plate 64b of the plate 64, and the other end of the tensile coil spring 65 is caught by the shaft 59. The plate 58 is biased to the opening portion side of the slot 4 by the action of the tensile coil spring 65. A terminal plate 66 is provided on the bottom portion, that is, the depth of the slot 4, and as shown in FIG. 15, the above-described terminals 6 connected to the charger 7 are buried in the terminal plate 66. In addition, when the terminals 28 and 29 of the inserted batter 2 reach the positions at which the terminals 28 and 29 are in contact with the terminals 6, the lock rod 45 is moved downwardly to be engaged in the engagement hole 30 of the battery 2. To allow the lock rod 45 to be moved downwardly for engaging with the engagement hole 30, a drop hole 58c for allowing the lock rod 45 to pass therethrough is formed in the plate 64.

When the battery 2 is not inserted in the slot 4 yet upon operation of the battery exchange apparatus 1, the solenoid 47 is biased and the plunger 54 is withdrawn in the solenoid 47. Accordingly, the lock rod 45 is in the state being withdrawn upwardly by turning of the arm 46 clockwise in FIG. 13. When the lock rod 45 is in the state being withdrawn upwardly, the engagement of the plate 58 with the lock rod 45 is released and thereby the plate 58 is in the state being pulled by the tensile coil spring 65 to be offset in the left direction in FIG. 13. As a result, the push bar 62 connected to the plate 58 via the brackets 61 is offset in the guide grooves 63 toward the opening portion of the slot 4.

When the battery 2 is inserted in the slot 4, an end surface (on which the terminals 28 and 29 are disposed) of the battery 2 comes in contact with the push bar 62 to push the push bar 62 deeper in the slot 4. On the other hand, the upper surface of the inserted battery 2 comes in contact with the actuator 56a to push up the actuator 56a, with a result that the limit switch 56 is turned on. The controller 3 recognizes the turn-on of the limit switch 56, and outputs a signal for stopping the energization of the solenoid 47. When the energization of the solenoid 47 is stopped in response to the signal, the arm 46 is pulled by the tensile coil spring 48 to be turned counterclockwise, so that the lock rod 45 is moved downwardly. In this case, since the lower end surface of the lock rod 45 is left in contact with the upper surface of the plate 58 until the push bar 62 is pushed to the depth of the slot 4 and the plate 58 is offset to a specific position by this action of the push bar 62, the lock rod 45 does not reach the lower end of the stroke and is kept on the way of the stroke.

When the push bar 62 is pushed to the depth of the slot 4, the plate 58 is offset in the same direction as that in which the push bar 62 is pushed, so that the terminals 28 and 29 of the battery 2 come into contact with the terminals 6. At this time, the lock rod 45 is dropped downwardly through the above-described drop hole 58b. In this way, the lower end of the lock rod 45 is engaged in the engagement hole 30 of the battery 2, and thereby the battery 2 is locked in the slot 4.

When the battery 2 is inserted in the slot 4, the charger 7 is energized by the controller 3, to start the charging of the battery 2. When the battery 2 thus charged is ready to be taken out of the slot 4, the solenoid 47 is energized according to the instruction of the controller 3 to pull the lock rod 45 upwardly, whereby the locking state is released. As a result, the push bar 62 is pulled by the tensile coil spring 65, to push the battery 2 out of the slot 4.

Figure 16:
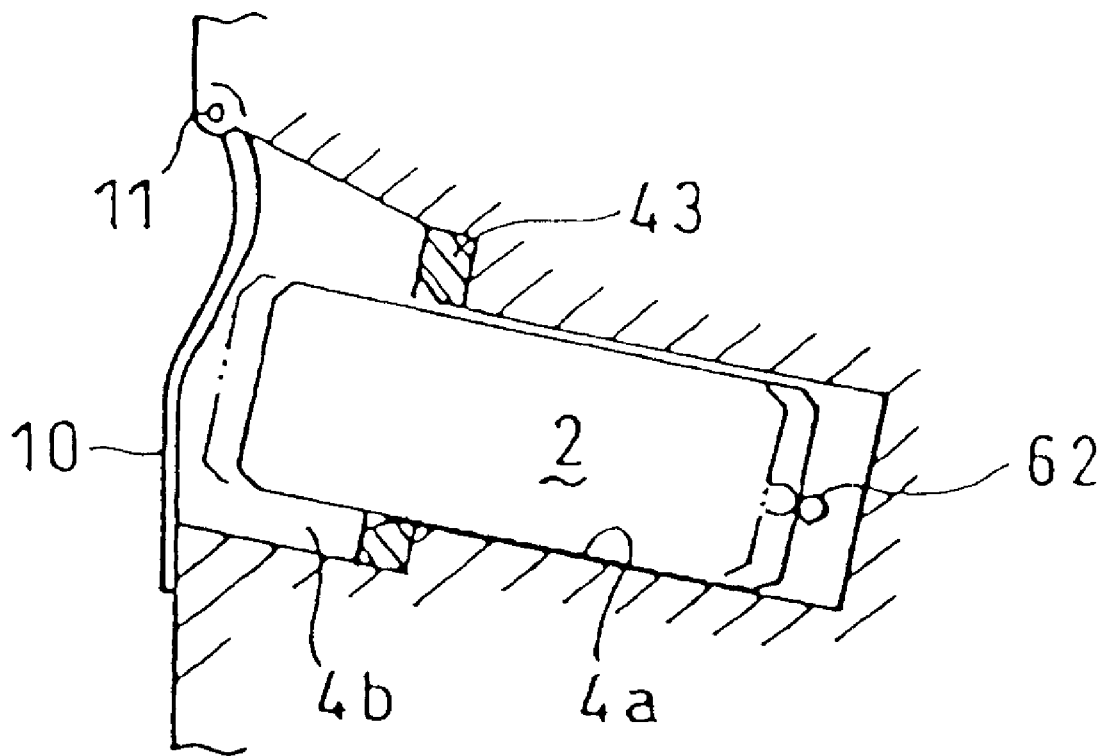
FIG. 16 is a sectional view schematically showing the shape of the slot.

FIG. 16 is a sectional view schematically showing the shape of the slot 4. As shown in FIG. 16, the slot 4 includes a first interior section 4a for supporting the battery 2, and a second interior section 4b formed into a shape allowing a user to easily hold the end portion of the battery 2 exposed in the second interior section 4b with his fingers. The second interior section 4b is opened from the inlet member 43 forwardly, that is, toward the door 10. As shown by a chain line in FIG. 16, the battery 2 projects toward the door 10 by the pushing action of the push bar 62.

The leading end, exposed from the slot 4 to the outside, of the battery 2 pushed by the push bar 62 projects forwardly more than the other battery 2 contained in another slot 4 in the state being not pushed by the push bar 62. Accordingly, it is possible for the user to easily take the battery 2 pushed by the push bar 62 out of the slot 4. The end portion of the battery 2 can be more easily held by the provision of the second interior section 4b in combination with the palm sized cross-sectional shape of the battery 2.

Figure 17:
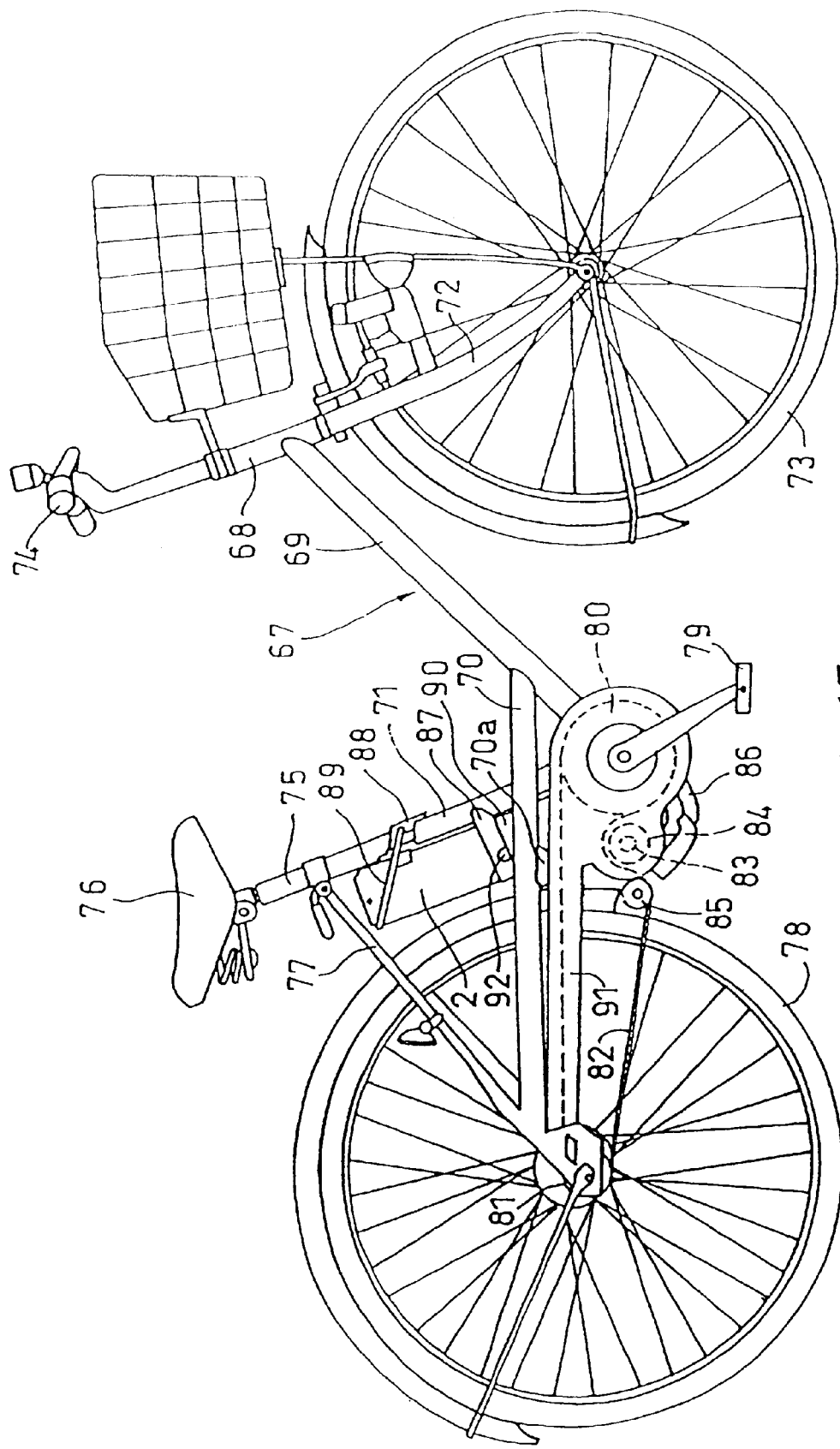
FIG. 17 is a right side view of a motor-assisted bicycle.
Figure 18:
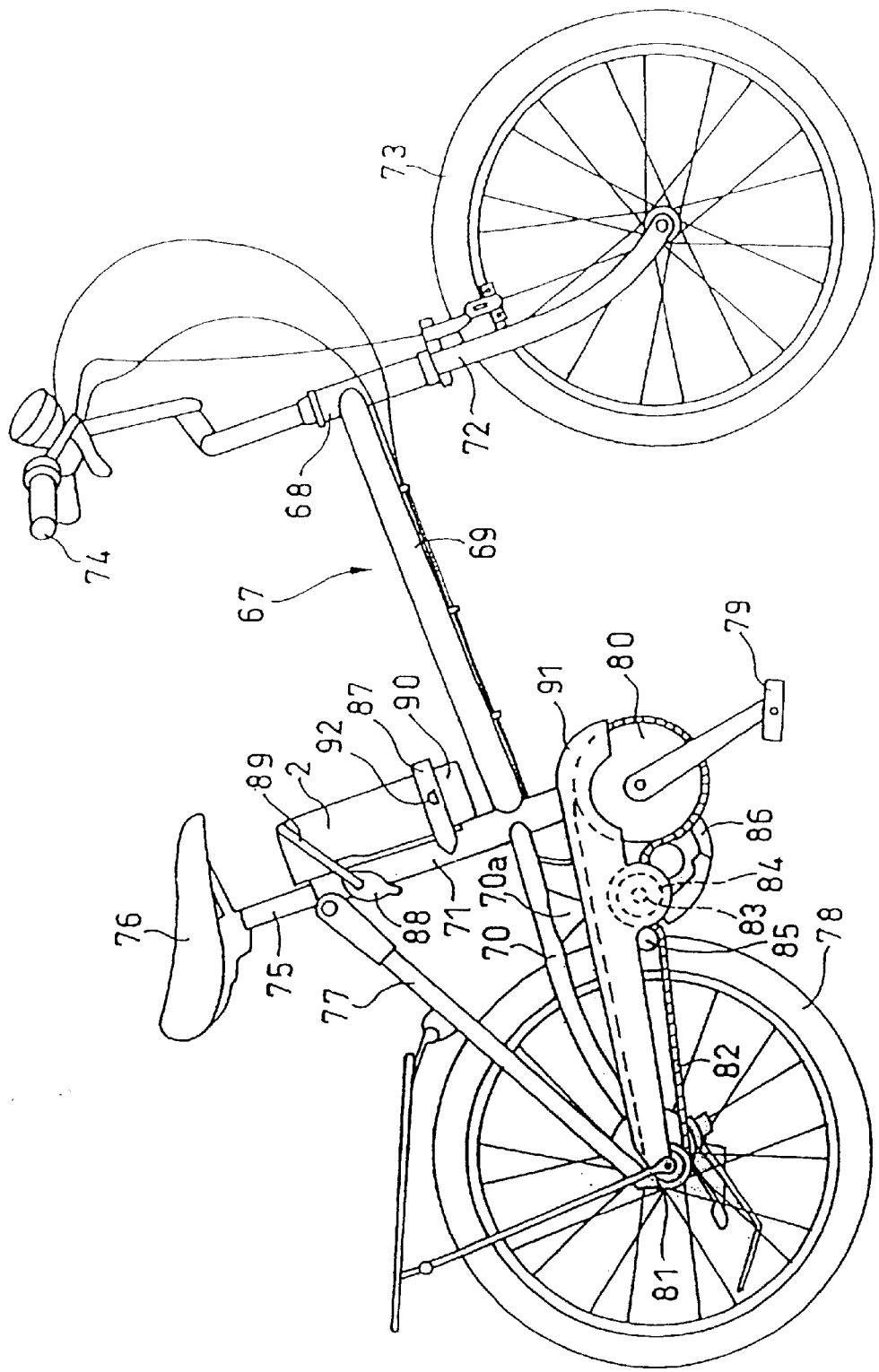
FIG. 18 is a right side view of a motor-assisted bicycle.
Figure 19:
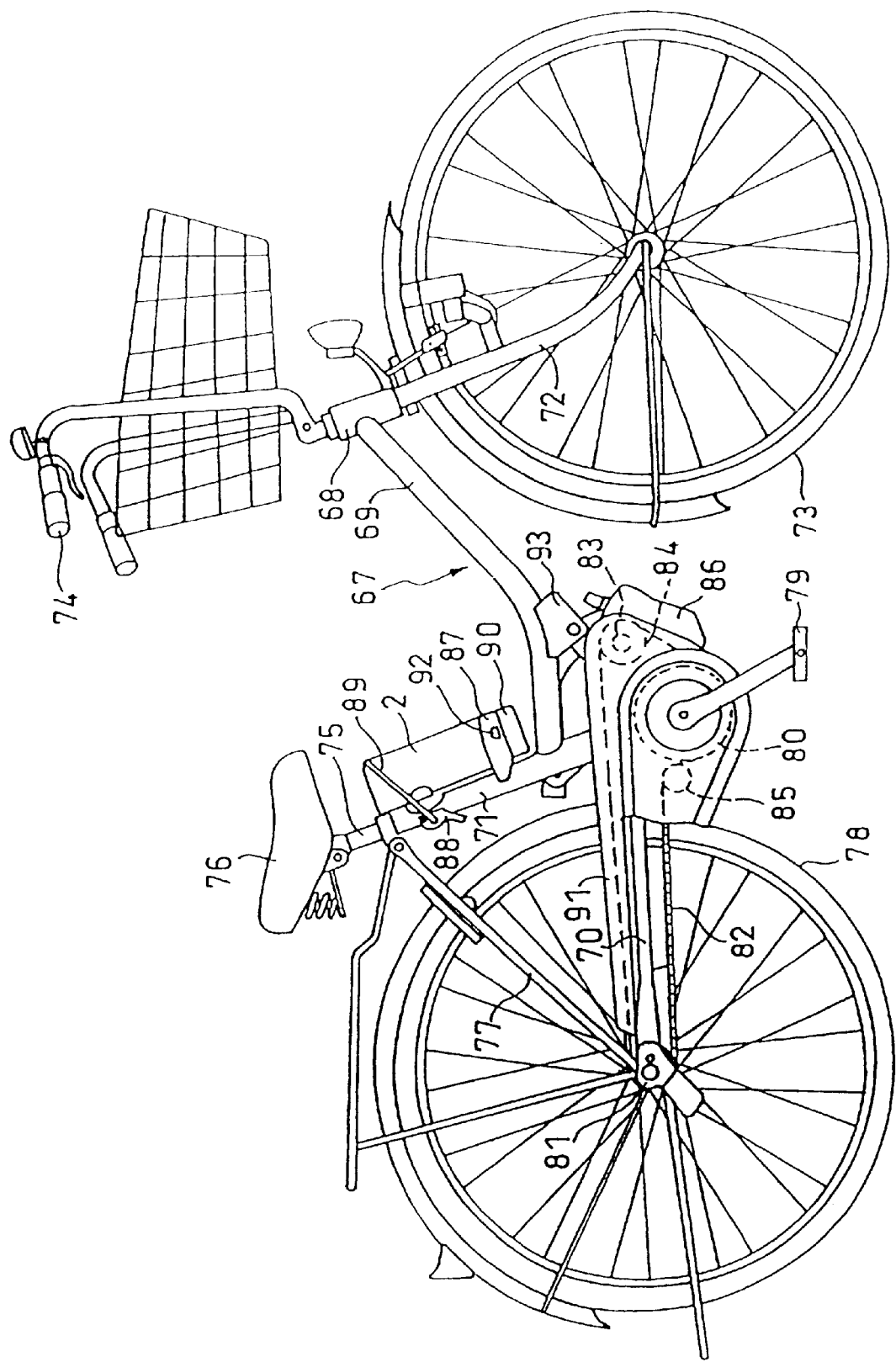
FIG. 19 is a right side view of a motor-assisted bicycle.

Next, a motor-assisted bicycle on which the battery 2 is mounted will be described. FIGS. 17, 18 and 19 are right side views each showing a motor-assisted bicycle on which the battery 2 is mounted. In these figures, the same parts are designated by the same characters. In FIG. 17, a body frame 67 includes a head pipe 68 disposed at the front end thereof; a down frame 69 extending rearwardly from the head pipe 68; a rear fork 70 connected to a portion near the lower end of the down pipe 69; and a seat post 71 connected to the lower end of the down pipe 69 and raised rearwardly, upwardly therefrom. A front fork 72 is steerably supported by the head pipe 68. A front wheel 73 is rotatably supported by the lower ends of the front fork 72. A handlebar 74 is connected to the upper end of the front fork 72.

A supporting shaft 75 telescopically fitted in the seat post 71 is provided on the seat post 71. A seat 76 is mounted on the upper end of the supporting shaft 75. A stay 77 extends rearwardly, downwardly from the upper end of the seat post 71, and crosses the rear fork 70. The stay 77 is integrated to the rear fork 70 at the crossing portion so as to provide a bearing for a rear wheel 78 thereof.

A bearing pipe (not shown) extending in the width direction of the vehicular body is connected to the crossing portion between the seat post 71 and the down pipe 69. Pedals 79 and a front sprocket 80 are provided on a crank shaft passing through the bearing pipe. The pedals 79 are of course provided on the right and left sides of the vehicular body. A rear sprocket 81 is connected to the center of the rear wheel 78. A chain 82 is sustained between the front sprocket 80 and the rear sprocket 81.

A power unit 86 including a motor capable of providing power for assisting the depressing force applied to the pedals 79 is provided on the motor-assisted bicycle. An output shaft 83 of the motor is disposed at a position adjacent to the rear side of the front sprocket 80. A chain 82 is wound around an assist sprocket 84 in such a manner as to run along the upper portion of the assist sprocket 84. The tension of the chain 82 is adjusted by changing the position of a tension adjusting sprocket 85. The power unit 86 is bolted to a bracket 70a fixed to the rear fork 70 by welding or the like and to a bracket (not shown) fixed to the lower end of the down pipe 69 by welding or the like.

A battery support 87 is welded to the seat post 71 in such a manner as to be positioned in a space between the seat post 71 and the rear wheel 78. The battery support 87 is formed into a dish shape, and the battery 2 is held on the battery support 87 in a state being erected in the vertical direction along the seat post 71 with the terminals 28 and 29 directed downwardly. The seat post 71 is provided with a buckle 88 and a snap ring 89 connected to the buckle 88. The snap ring 89 is caught by the stepped portions 36 at the upper end corners of the battery 2, and the upper end of the battery 2 is certainly fixed to the seat post 71 by turning the buckle 88.

A power feeding unit 90 including contacts being in contact with the terminals 28 and 29 is provided on the bottom side of the battery 2. Power is supplied from the battery 2 to the power unit 86 via the power feeding unit 90. A chain cover 91 for covering the upper side of the chain 82 is formed into a shape for further covering the front sprocket 80 and the assist sprocket 84 entirely. A hole 92 matched to the through-hole 35 formed in the battery pack 26 is formed in the battery support 87. The burglar of not only the motor-assisted bicycle but also the battery 2 can be prevented by allowing a wire or rope portion taken as a key to pass through the hole 92 and the through-hole 35 in the battery pack 26 and also to pass through the rear wheel 78 to lock the wire or rope portion.

According to the motor-assisted bicycle shown in FIG. 18, the battery support 87 is fixed to the front side of the seat post 71, and the battery 2 is positioned in front of the seat post 71. In this way, for the body frame in which a battery installation space cannot be ensured behind the seat post 71, the battery 2 can be mounted in front of the seat post 71. In this configuration, with respect to the front sprocket 80, only the part (upper portion) thereof is covered with the chain cover 91.

According to the motor-assisted bicycle shown in FIG. 19, the end portion of the down pipe 69 is butted and connected to an intermediate portion of the seat post 71. The rear fork 70 extends rearwardly from the lower end of the seat post 71, that is, a portion near the crank shaft of the seat post 71. In this structure of the body frame 67, it is difficult to ensure the space for installing the power unit 86 behind the front sprocket 80. For this reason, the power unit 86 is disposed in front of the front sprocket 80, and the assist sprocket 84 around which the chain 82 is wound is disposed in front of the front sprocket 80. To realize the disposition of the power unit 86, part of the power unit 86 is connected to the body frame 67 via a bracket 93 welded to the lower portion of the down pipe 69.

The state of mounting the power unit 86 on the body frame 67 will be more fully described.

Figure 20:
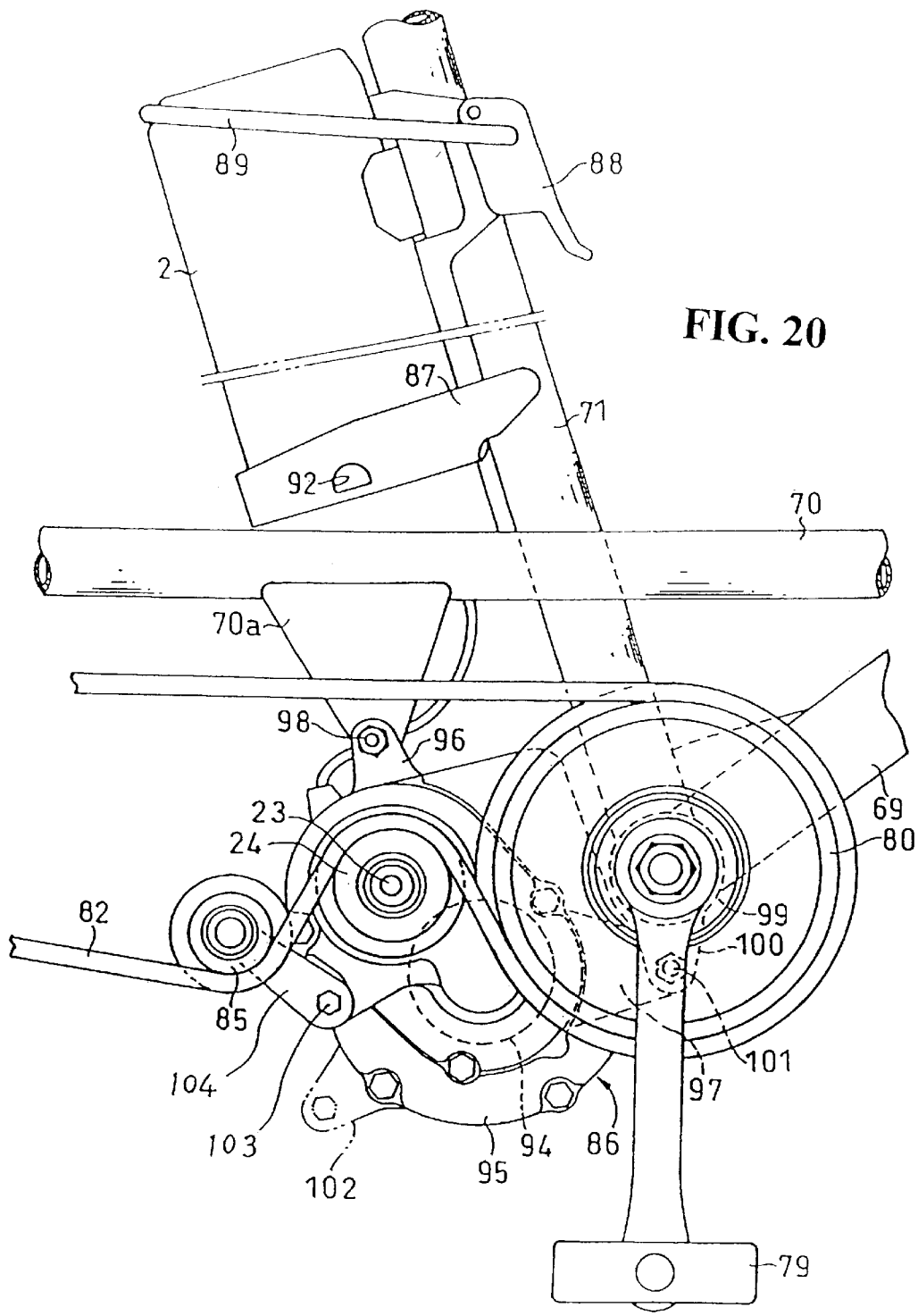
FIG. 20 is an enlarged view showing an essential portion of the motor-assisted bicycle.

FIG. 20 is an enlarged view showing an essential portion of the motor-assisted bicycle shown in FIG. 17. In this figure, parts corresponding to those shown in FIG. 17 are designated by the same characters, and the chain cover 91 is omitted. Referring to FIG. 20, the power unit 86 incorporates a motor 94, and the rotation of the motor 94 is transmitted to the output shaft 23 via a transmission mechanism (not shown). Bosses 96 and 97 project outwardly from a casing 95. The boss 96 is connected to the bracket 70a provided on the rear fork 70 with a bolt-and-nut 98, and the boss 97 is connected to a bracket 100 projecting downwardly from a bearing pipe 99 for connecting the down pipe 69 to the seat post 71 with a bolt-and-nut 101.

It may be desirable that the power unit 86 be matched to any one of various types of body frames from the manufacturing viewpoint. For this reason, the casing 95 mountable on various models of body frames is manufactured by using a common "model". To be more specific, letting a distance between bolt-holes formed between the bosses 96 and 97 be "S", a third boss 102 located at a position separated from both the above bolt-holes by the distance S is assumed. On the above assumption, it is decided, in accordance with the model of the body frame to which the casing is to be mounted, which bosses are provided on the molded product of the casing. By setting the manufacturing "model" of the casing as described above, it is possible to manufacture various casings capable of being matched to various types of body frames to which the casings are to be mounted.

The tension adjusting sprocket 85 is mounted on a lever 104 rotatably supported by the casing 95 via a pivot 103. The lever 104 is biased by a spring means (not shown) to be turned in the counterclockwise direction in the figure, so that the tension adjusting sprocket 85 is turned to give a suitable tension to the chain 82. In the above-described embodiments, the battery 2 is mounted to a motor-assisted bicycle. However, the battery 2 may be used for other electric appliances such as a portable cassette deck or a CD player. When the battery 2 is used as a power-supply unit of each of these electric appliances, it is required to provide an adapter for connecting the battery 2 to an input terminal of the electric appliance. To certainly connect the adapter to the battery 2, the above-described engagement holes 30 and 30A can be effectively used.

Referring to FIG. 12, an adapter 105 can be held on the battery pack 26 by making use of the engagement holes 30 and 30A. The adapter 105 has a terminal (not shown) which is brought into contact with the terminals 28 and 29 when the adapter 105 is connected to the battery pack 26. The battery 2 can be connected to the electric appliance via a cord 106 led from the terminal.

In this way, the battery 2 is shared between the motor-assisted bicycle and an electric product, and accordingly, at the destination of cycling on the motor-assisted bicycle, it is possible to supply power from the battery removed from the motor-assisted bicycle to an audio product, and hence to enjoy music even if it is difficult to obtain a power-supply outdoors such as in the fields, nature, etc.

As described above, according to the present invention, it is possible to easily take a battery in or out of the battery exchange apparatus including the containing portion formed into a cylindrical shape with a bottom for receiving the battery therein to charge it. Accordingly, it is possible to eliminate the need of the provision of any additional part such as a handle to the battery for taking the battery in or out of the battery exchange apparatus, and hence to simplify the external shape of the battery.

As is apparent from the above description, according to the present invention, it is possible to provide a small-size battery exchange apparatus suitable to be used in an indoor facility. In particular, according to the battery exchange apparatus described in the present invention, since the inner atmosphere is dependent on atmospheric air at a location where the apparatus is installed, it is not required to provide an air conditioning system. According to the battery exchange apparatus described in the present invention, even if the height of the apparatus becomes low, it is possible to ensure a number of batteries contained in the containing portion of the apparatus. According to the battery exchange apparatus described in the present invention, a battery can be certainly retained in the containing portion during charging of the battery. According to the battery exchange apparatus described in the present invention, it is possible to recognize the reception of batteries and the presence or absence of an already charged battery, and hence to the usability of the apparatus.

According to the battery exchange apparatus described in the present invention, since the battery containing portion is disposed at an intermediate portion in the height direction, it is possible to easily insert and remove a battery in or from the containing portion, and to enhance the visibility of the guiding means. According to the battery exchange apparatus described in the present invention, the atmosphere in the apparatus is forcibly ventilated with an atmospheric air at a location where the apparatus is installed. According to the battery exchange apparatus according to the present invention, since the apparatus is installed in a convenience store, it is possible to further increase the effect of ensuring a high visibility of the interior of the store without spoiling the interior design thereof.

As described above, according to the present invention, it is possible to provide a battery easily taken in or out of a battery exchange apparatus. In particular, according to the present invention, the battery can be handled with even one hand, and can be certainly contained in a battery exchange apparatus having locking means. According to the present invention, since the projecting stripes can be brought into slide-contact with a surface of a battery containing portion, it is possible to improve the operability when taking the battery in or out of the containing portion.

According to the present inventions, since the projecting stripes are in slide-contact with another member as described above, the design seal positioned at depth between the projecting stripes can be prevented from being damaged. Further, according to the present invention, it is possible to use the battery not only as a power source of a vehicle but also as a power source of another electric equipment, and hence to enhance the applicability of the battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery exchange apparatus for containing a battery, and a charger for charging said battery, comprising:
   a containing portion having an interior depth greater than a length of said battery to be completely contained therein, the containing portion including:
   a first interior section extending inwardly from a predetermined depth within the containing portion to an interior end of the containing portion, the first interior section being adapted for receiving and securing an end of said battery for connecting to said charger; and
   a second interior section extending outwardly from said predetermined depth to an outside face of said containing portion, wherein said second interior section has a cross sectional area sufficiently larger than a cross sectional area of the first interior section, for allowing an opposite end of said battery extending outwardly into said second interior section to be readily grasped for insertion and removal into said containing portion.

2. The battery exchange apparatus according to claim 1, wherein a plurality of containing portions are arranged in groups in both a vertical and a horizontal direction; and
   a door is provided commonly to each group of said containing portions arranged in the vertical or horizontal direction.

3. The battery exchange apparatus according to claim 1, wherein a plurality of containing portions are arranged in groups in both a vertical and a horizontal direction; and
   a door is provided commonly to each group of said plurality of containing portions arranged in the vertical or horizontal direction.

4. A chargeable battery used for a battery exchange apparatus capable of exchanging an exhausted battery for an already charged battery, said chargeable battery being composed of a plurality of battery cells contained in a battery pack, comprising:
   said battery pack being graspable by hand, and having a length shorter than a depth of a containing portion of said battery exchange apparatus so that said battery pack may be contained completely within a containing portion;
   said battery pack having a parting plane running lengthwise along a surface of said battery pack facing upward when a front end of said battery pack is inserted into said battery charger; and
   said battery pack having an engagement hole disposed on said parting plane of said surface facing upward for engaging with a locking means of said battery exchange apparatus when said battery pack is moved into and out of said containing portion.

5. The chargeable battery according to claim 4, wherein said chargeable battery has a pair of terminals connected to said battery cells; and said pair of terminals are disposed on said front end of said battery pack in such a manner as to be symmetrical with respect to said parting plane.

6. The chargeable battery according to claim 5, wherein a second engagement hole is formed in a surface opposed to a surface in which said engagement hole is formed; and said engagement hole and said second engagement hole are set to be fitted to an adapter for supplying power to equipment which uses said battery as a power source.

7. The chargeable battery according to claim 5, wherein projecting stripes extending in the longitudinal direction of said battery pack are formed on a first surface opposed to a second surface in which said engagement hole is formed in such a manner as to be symmetrical with respect to said parting plane.

8. The chargeable battery according to claim 4, wherein a second engagement hole is formed in a surface opposed to a surface in which said engagement hole is formed; and said engagement hole and said second engagement hole are set to be fitted to an adapter for supplying power to equipment which uses said battery as a power source.

9. The chargeable battery according to claim 4, wherein projecting stripes extending in the longitudinal direction of said battery pack are formed on a surface opposed to said surface facing upward in which said engagement hole is formed.

10. The chargeable battery according to claim 9, wherein a design seal is positioned between said projecting stripes symmetrically formed.

11. The chargeable battery according to claim 10, wherein said design seal is a seal informing that a battery is recyclable.

* * * * *